US008086064B2

(12) United States Patent
Devoy et al.

(10) Patent No.: US 8,086,064 B2
(45) Date of Patent: Dec. 27, 2011

(54) SYSTEM AND METHOD FOR GENERATING AN IMAGE ENHANCED PRODUCT

(75) Inventors: James M. Devoy, Rochester, NY (US); Megan M. Schneider, Rochester, MN (US); Kimberly B. Hajec, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 968 days.

(21) Appl. No.: 12/024,665

(22) Filed: Feb. 1, 2008

(65) Prior Publication Data

US 2009/0196520 A1    Aug. 6, 2009

(51) Int. Cl.
G06K 9/40    (2006.01)
(52) U.S. Cl. ........................................................ 382/274
(58) Field of Classification Search .................. 382/274; 430/356
See application file for complete search history.

(56) References Cited

U.S. PATENT DOCUMENTS

| 5,083,638 | A | 1/1992 | Schneider |
| 5,243,381 | A | 9/1993 | Hube |
| 5,815,645 | A | 9/1998 | Fredlund et al. |
| 5,986,671 | A | 11/1999 | Fredlund et al. |
| 6,285,468 | B1 | 9/2001 | Cok et al. |
| 6,344,853 | B1 | 2/2002 | Knight |
| 6,476,903 | B1 | 11/2002 | Slater et al. |
| 6,956,671 | B2 | 10/2005 | Monty et al. |
| 6,958,821 | B1 | 10/2005 | McIntyre |
| 6,992,787 | B2 | 1/2006 | Fredlund et al. |
| 7,003,731 | B1 | 2/2006 | Rhoads et al. |
| 7,107,221 | B1 | 9/2006 | Tracy et al. |

FOREIGN PATENT DOCUMENTS

| EP | 1 124 200 A2 | 8/2001 |
| EP | 1124200 A2 * | 8/2001 |
| WO | WO 01/82231 A2 | 11/2001 |
| WO | WO 01/82587 A1 | 11/2001 |
| WO | WO 03/081466 A2 | 10/2003 |

OTHER PUBLICATIONS

Jesus Angulo and Jean Serra, "Modelling and segmentation of colour images in polar representations", Apr. 2007, Journal of Image and Vision Computing, vol. 25, Issue 4.*

* cited by examiner

*Primary Examiner* — Gregory F Cunningham
(74) *Attorney, Agent, or Firm* — Roland R. Schindler, II

(57) ABSTRACT

A system for generating an image enhanced output product and method for operating the same are provided. An image enhanceable product is identified having a tangible surface and a printing map is defined that defines a plurality of window areas in which images are to be printed on the tangible surface. A desired visual impact characteristic is determined based upon the appearance of the image enhanceable product and the printing map and a selection of a plurality of digital images are received. An image processing method is selected method based upon the determined visual impact characteristic and at least one of the digital images is automatically processed in accordance with the selected image processing method. At least some of the digital images, including the automatically processed image, are provided on the tangible surface according to the printing map.

24 Claims, 15 Drawing Sheets

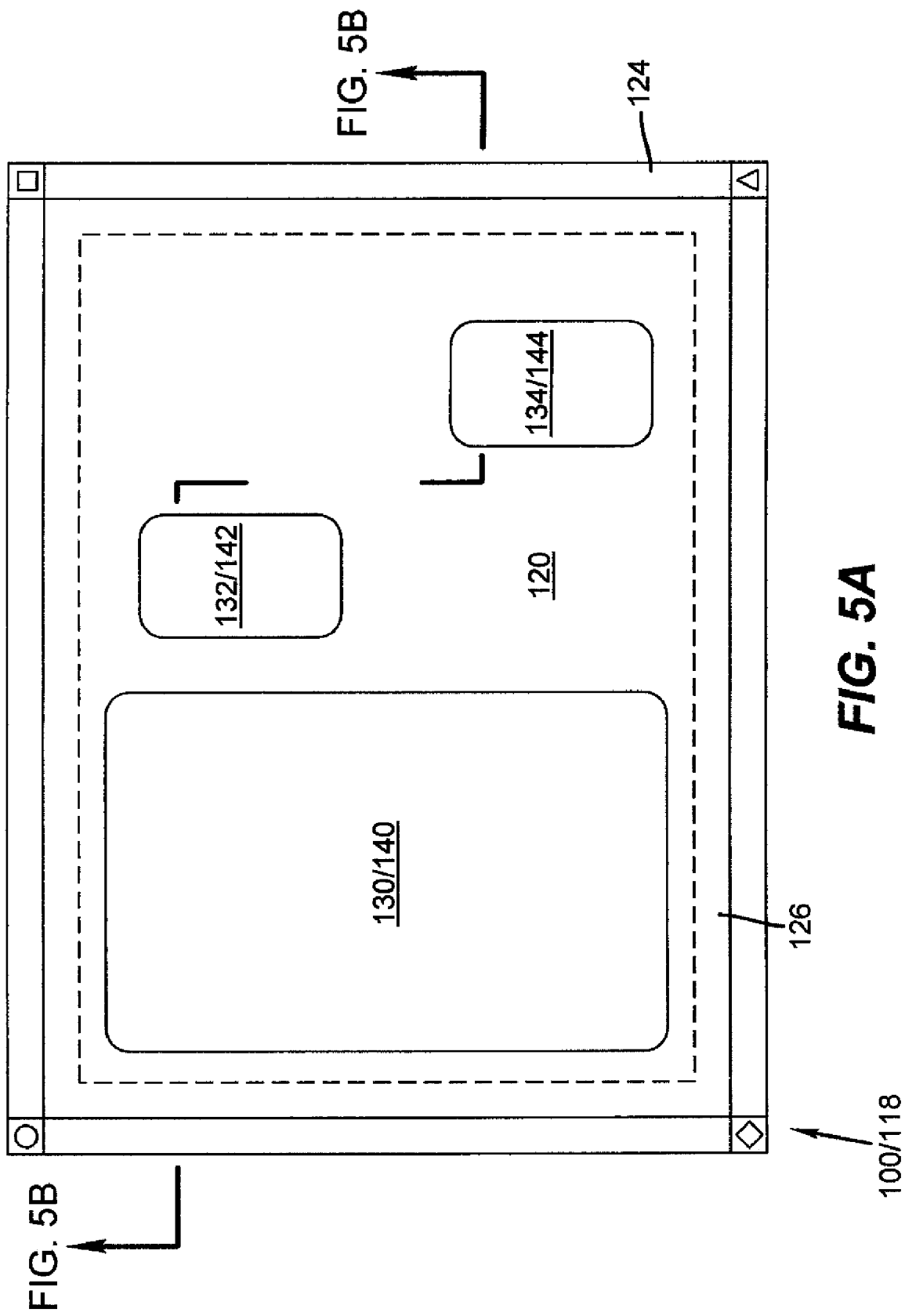

| PATTERN | | PRINTING MAP ANALYSIS | | | VISUAL IMPACT CHARACTERISTIC |
|---|---|---|---|---|---|
| | | REFLECTANCE TRANSMITTANCE | UNIFORMITY | COHERENCY | MATCHING |
| | MULTI DIMENSIONAL | | | | |
| LOW INTENSITY LOW FREQUENCY | 2D REGULAR | GLOSSY REFLECTIVE | CONSISTENT | HIGH | BASIC GEOMETRIC | CONTEMPORARY |
| HIGH INTENSITY | 2D IRREGULAR | GLOSSY REFLECTIVE | IRREGULAR | LOW | BASIC GEOMETRIC BASIC EDUCATIONAL | YOUTH |
| LOW INTENSITY LOW FREQUENCY | 2D | MATTE OR GLOSSY | CONSISTENT | HIGH | COMPLED GEOMETRIC | URBAN |
| LOW INTENSITY LOW FREQUENCY | 2D | SEMI-GLOSS MATTE REFLECTIVE | CONSISTENT - SOFT | HIGH | BASIC GEOMETRIC | WARM |
| HIGH INTENSITY IRREGULAR INTER IMAGE PATTERNS | 2D | MATTE REFLECTIVE | IRREGULAR BORDERS | HIGH/MLD | ANY | WEATHERED |
| | 2D | SEMIGLOSS MATTE REFLECTIVE | CONSISTENT | HIGH | PERIOD ARRANGEMENTS | COLONIAL/VICTORIAN |
| NO PATTERN INSIDE | 2D | TRANSPARENT GLOSSY | ANY | ANY | ANY | TRANSPARENCY |
| HIGH INTENSITY HIGH FREQUENCY | 3D | MATTE | ANY | LOW COHERENCE | AGGRESSIVE | ACTIVE |

FIG. 14

SYSTEM AND METHOD FOR GENERATING AN IMAGE ENHANCED PRODUCT

FIELD OF THE INVENTION

The present invention relates to the field of usering works of communication, and in particular the creation, sharing and production of works of communication.

BACKGROUND OF THE INVENTION

Personalized image collages, clothing, albums and other image enhanced items are becoming increasingly more accessible at the retail level as printing and digital technologies improve and drop in cost. However, as the ability to deliver a personalized image bearing product has become more accessible, the novelty and perceived value of such gifts has diminished and consumers have become more discriminating. In particular, consumers now seek items that bear customized images in a more seamless and integrated manner. However, few consumers are equipped with the combination of artistic, aesthetic and technical gifts necessary to successfully master such items. Further, those who are so equipped often lack the time necessary to do this task effectively.

Accordingly, while becoming somewhat more common, many items having customized images are still considered novelties. What is needed in the art is a new paradigm to help consumers generate more valuable image/item combinations—particularly where a plurality of images will be incorporated into a single item.

SUMMARY OF THE INVENTION

A system for generating an image enhanced output product and method for operating the same are provided. In accordance with the method, the following steps are performed: identifying an image enhanceable product having a tangible surface on which a plurality of images can be provided; determining a printing map that defines a plurality of window areas in which images are to be printed on an image receiving medium with each window being defined at least by a window shape, and location information defining a location of the window area relative to the tangible surface; automatically determining at least one desired visual impact characteristic for the image enhanced product based upon the appearance of the image enhanceable product and the printing map; receiving a selection of a plurality of digital images that are available for use in the image product; automatically selecting at least one image processing method for processing at least one of the plurality of digital images for inclusion in the image enhanced product based upon the determined visual impact characteristic for the image enhanced product; automatically processing at least one of the digital images in accordance with the automatically selected image processing method; and providing at least some of the digital images, including the automatically processed image, on the tangible surface according to the printing map in a form that can be used to create the image enhanced output product.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 5A and 5B show, respectively, a top view and a side view of another, non-limiting example of an image enhanceable product comprising a conventional matte and frame combination;

DETAILED DESCRIPTION OF THE INVENTION

Figure 1:
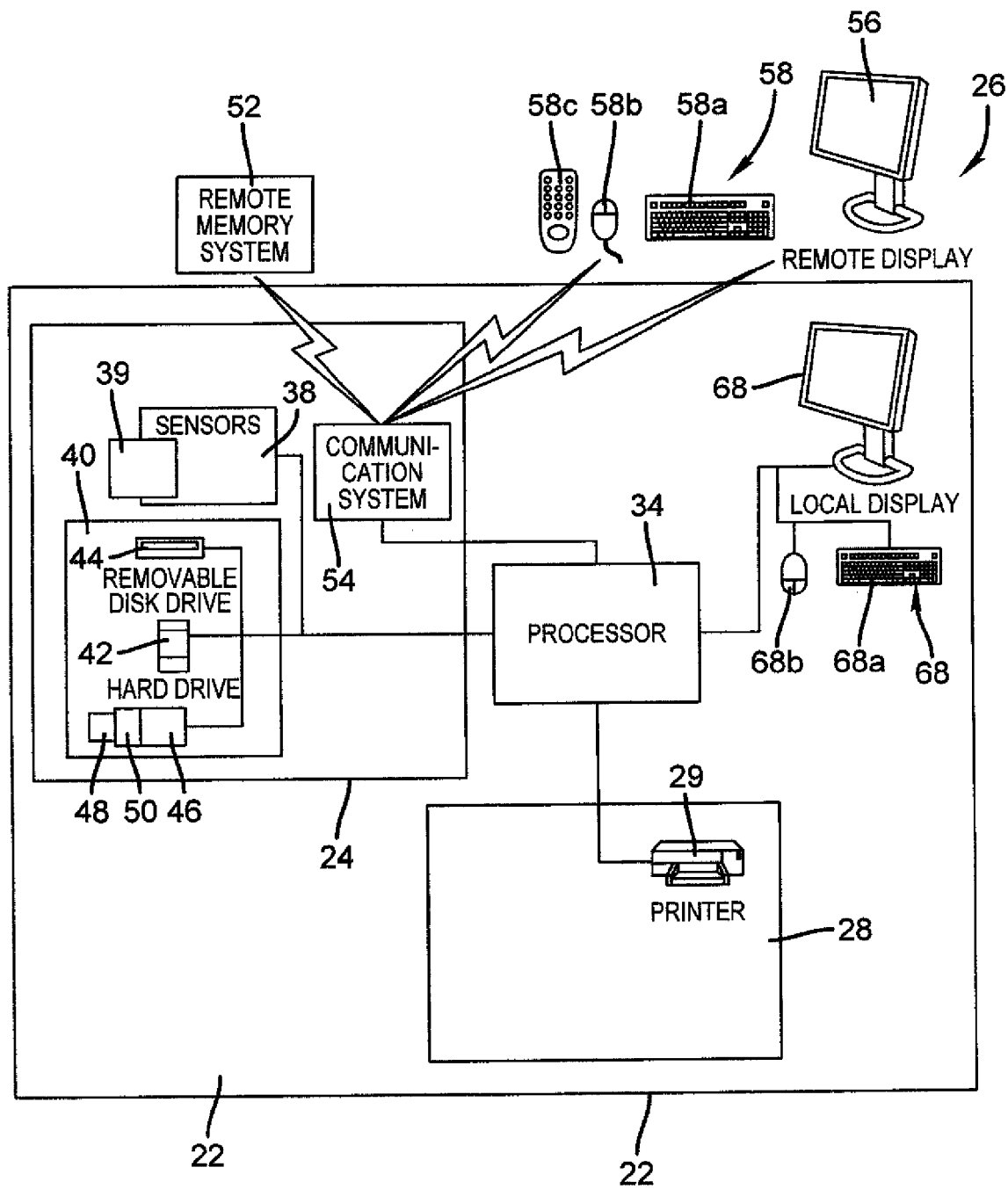
FIG. 1 shows an embodiment of a system for generating an image enhanced product.

FIG. 1 illustrates a first embodiment of an electronic system 20 that can be used in generating an image enhanced product. In the embodiment of FIG. 1, electronic system 20 comprises a housing 22 and a source of content data files 24, a user input system 26 and an output system 28 connected to a processor 34. The source of content data files 24, user input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image enhanced item. In this regard, the content data files can comprise, for example and without limitation, still images, image sequences, video graphics, and computer generated images. Source of content data files 24 can optionally capture images to create content data for use in content data files by use of capture devices located at electronic system 20 and/or can obtain content data files that have been prepared by or using other devices. In the embodiment of FIG. 1, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid state, magnetic, optical or other data storage devices. Memory 40 can be fixed within system 20 or it can be removable. In the embodiment of FIG. 1, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system.

In the embodiment shown in FIG. 1, system 20 has a communication system 54 that in this embodiment can be used to communicate with an optional remote memory system 52, an optional a remote display 56, and/or optional remote input 58. A remote input station including a remote display 56 and/or remote input controls 58 (also referred to herein as "remote input 58") can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 26 provides a way for a user of system 20 to provide instructions to processor 34. This allows such a user to make a designation of content data files to be used in generating an image enhanced output product and to select an output form for the output product. User input system 26 can also be used for a variety of other purposes including, but not limited to, allowing a user to arrange, organize and edit content data files to be incorporated into the image enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 1, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 1. Similarly, local input 68 can take a variety of forms. In the embodiment of FIG. 1, local display 66 and local user input 68 are shown directly connected to processor 34.

Figure 2:
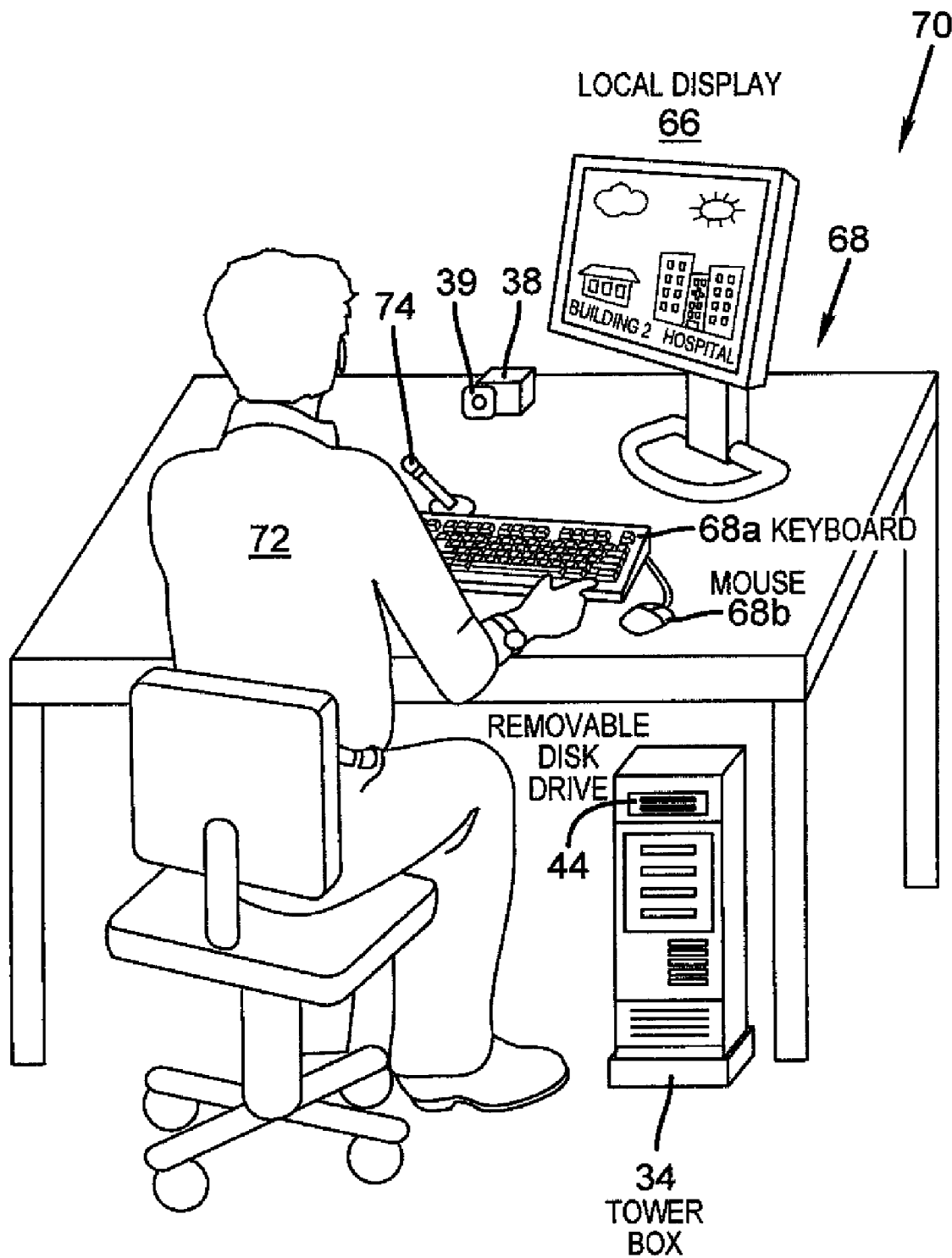
FIG. 2 shows an embodiment of a work station or kiosk that can be used in a system of FIG. 1.

As is illustrated in FIG. 2, local user input 68 can take the form of an editing studio or kiosk 70 (hereafter also referred to as an "editing area 70"). In this illustration, a user 72 is seated before a console comprising local keyboard 68a and mouse 68b and a local display 66 which is capable, for example, of displaying multimedia content. As is also illustrated in FIG. 2, editing area 70 can also have sensors 38 including, but not limited to, video sensors 39, audio sensors 74 and other sensors such as multispectral sensors that can monitor user 72 during a usering or production session.

Output system 28 is used for rendering images, text or other graphical representations in a manner that allows image enhanceable item to be converted into an image enhanced product. In this regard, output system 28 can comprise any conventional structure or system that is known for printing or recording images, including, but not limited to, printer 29. Printer 29 can record images on a tangible surface 30 using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 3:
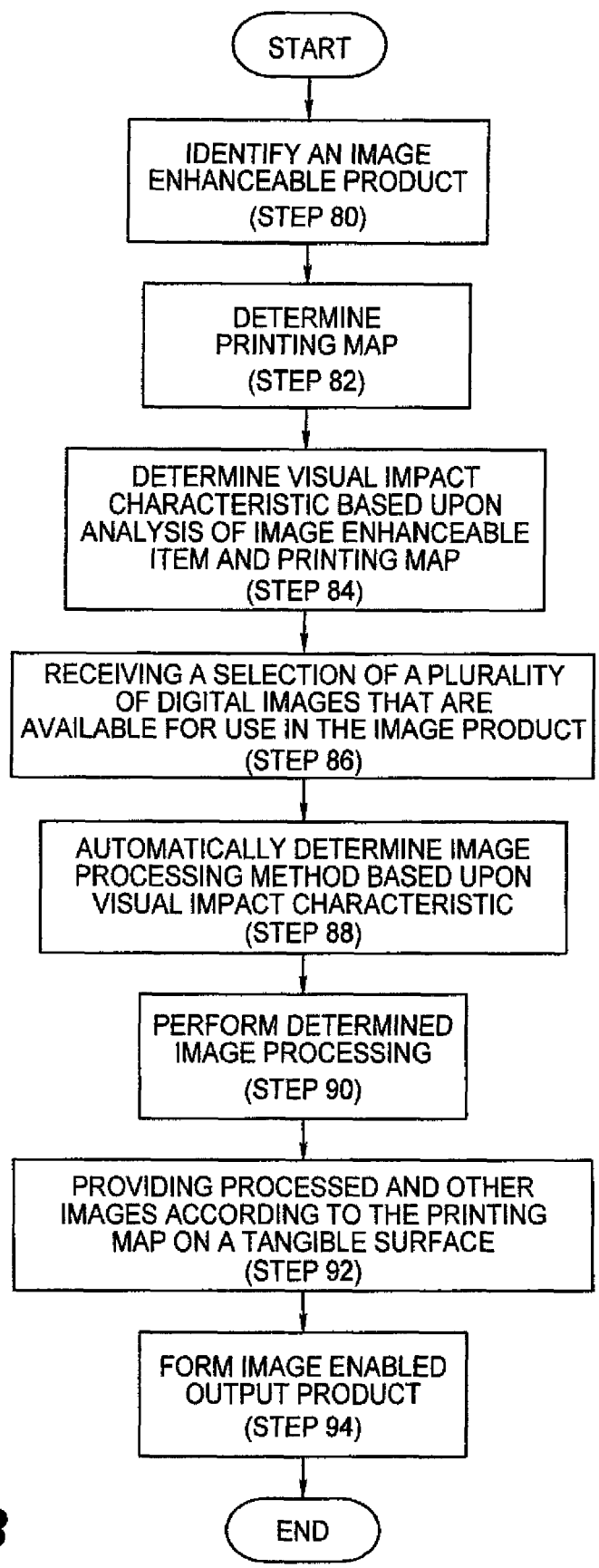
FIG. 3 illustrates s a first embodiment of a method for using an image enhanceable item to generate an image enhanced output product.

Turning now to FIG. 3, what is illustrated is a first embodiment of a method for using an image enhanceable item to generate an image enhanced output product that can be executed, for example, by the system 20 of FIGS. 1 and 2.

As is shown in the embodiment of FIG. 3, in a first step of the method, an image enhanceable product is identified (step 80). Typically, this is done when a user input system 26 detects that user 72 has made a user input action that can be interpreted by processor 34 as a selection of one of a plurality of possible image enhanceable items. Alternatively, the type of image enhanceable item can be identified based upon stored information regarding user 72 or some other person including, but not limited to, user preferences, past user interactions and other factors. It will be appreciated that such an identification can be made automatically when, for example, it is determined that system 20 is optimized or otherwise configured to generate only one type of image enhanced output product.

As used herein the term image enhanceable item 100 includes anything that has a tangible surface 30 on which a plurality of images can be formed, located, placed or otherwise provided. For example and without limitation, an image enhanceable item 100 can take the form of a collage, photo book, scrap book, photo calendar, mug, stein, cup, stemware, jewelry, tile, mosaic, home décor, mousepads, pillowcases, pen & pencil holders, a simulated or actual bushstroke image on canvas, a photo-realistic image on a canvas, a keepsake box, a fleece blanket, coasters, frames, ornaments, round ornament, snowflake ornament, filigree ornament, pewter ornament, holiday ornament set, annual ornament set, playing cards, puzzle, teddy bear or other stuffed animal, wall paper, packaging, apparel & accessories, including, but not limited to, a T-shirt, a tie, a tote bag, apron, baby onesie, performance shirt, and/or frame, matte and image combinations and collages, mailing labels, gift tags stamps, or any other tangible thing.

Figure 4:
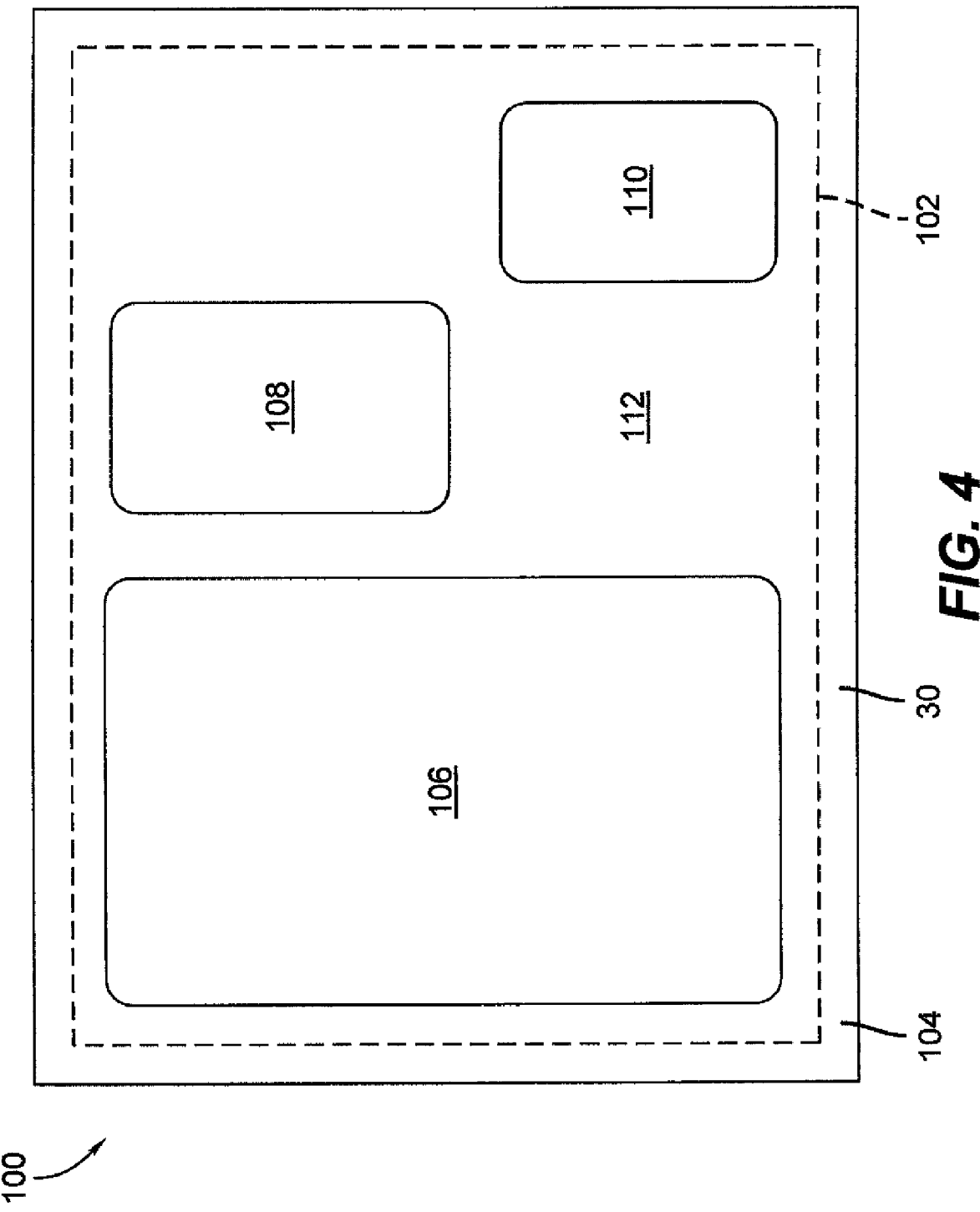
FIG. 4 illustrates one, non-limiting, example of an image enhanceable item.

FIG. 4 shows one, non-limiting, example of an image enhanceable item 100. As is shown in the embodiment of FIG. 4, in this image enhanceable item 100 comprises a tangible surface 30 that is provided in the form of a sheet. In this example, image enhanceable item 100 is shown having an image receiving area 102 that comprises less than all of a first side 104 of tangible surface 30. However, it will be appreciated that image receiving area 102 can comprise the entire width and/or length and/or depth of tangible surface 30. In still other embodiments, the image receiving area 102 can comprise substantially less than all of an available tangible surface 30 of an image enhanceable item 100. As is also shown in FIG. 4, image receiving area 102 can include a plurality of window areas 106, 108 and 110 which images are preferably recorded. Between window areas 106, 108 and 110 is an inter-window area 112. Inter-window area 112 is illustrated as having a stipple pattern recorded thereon so as to better illustrate the boundaries of window areas 106, 108 and 110. However, it will be appreciated that in other embodiments, inter-window area 112 can be blank, colored, textured, and/or can support images, text or other forms of graphic information, and/or can support, or can bear or can be left to bear other articles such as artifacts, separate labels or other items that can be joined to tangible surface 30. Inter-window area 112 can be reflective or translucent as desired, inter-window area 112 can also have a matte finish, glossy finish or semi-gloss finish as desired.

Figure 5B:
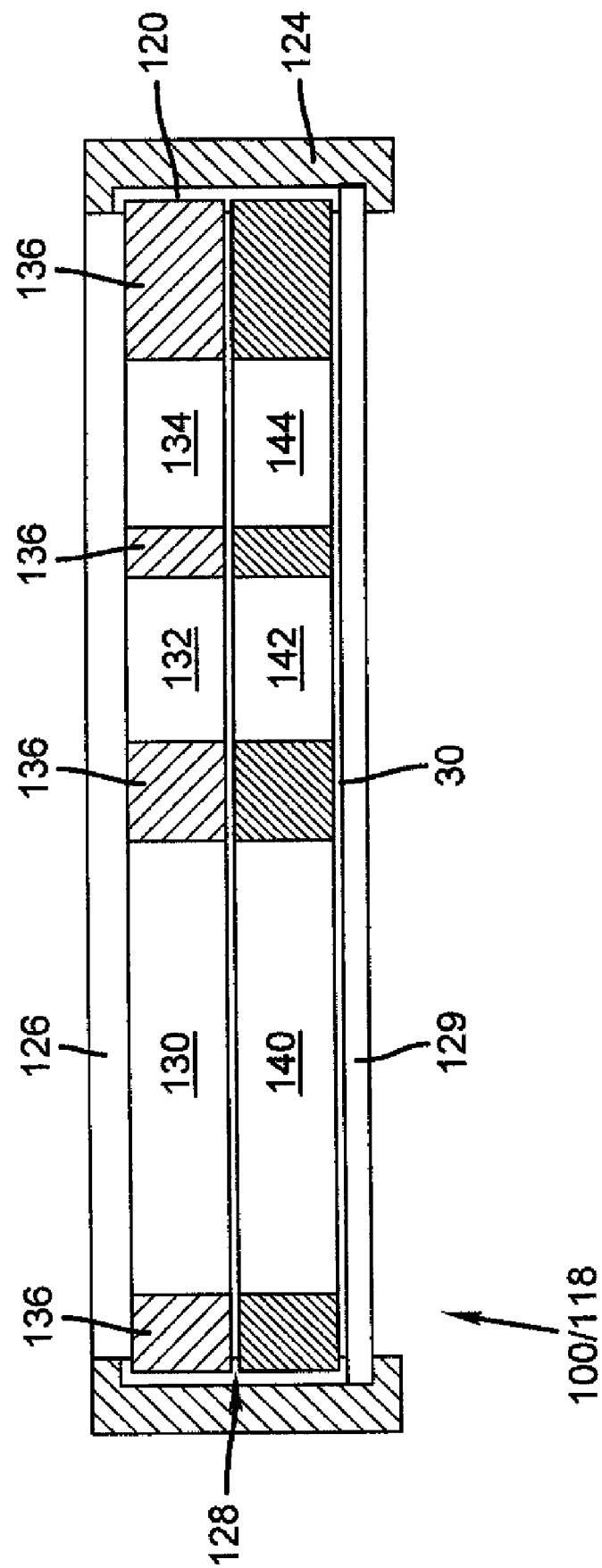

FIGS. 5A and 5B show, respectively, a top view and a section elevation view of another, non-limiting example of an image enhanceable product 100. In this embodiment, image enhanceable product 100 comprises a conventional matte and frame combination 118 having an external structural frame 124, with a light transmissive area 126 and an internal area 128 that is adapted to hold a framing matte 120 and a tangible surface 30. In the embodiment of FIGS. 5A and 5B, framing matte 120 defines a plurality of windows 130, 132 and 134 that allow light to pass through an inter-window area 136 of framing matte 120 so that portions 140, 142 and 144 of tangible surface 30 that are registered with windows 130, 132 and 134 can be seen outside of framing system 120 while other portions of tangible surface 30 are blocked from view. In the embodiment that is illustrated, it is assumed that windows 130, 132 and 134 are essentially transparent and can optionally comprise openings through framing matte 120. However, it will be appreciated that in various embodiments, windows 130, 132, and 134 can comprise transparent or semi-transparent materials that allow light to pass therethrough in a modified form. For example, windows 130, 132, and 134 can filter, soften, or even selectively block portions of light passing therethrough as may be desired. In certain embodiments, liquid crystal display or other active or semi-active light blocking materials can be used. Further, in certain embodiments, filtering can be performed for artistic or aesthetic purposes, while in the same or other embodiments, filtering can be protective such as where the filtering blocks forms of light that can damage framing matte 120 or tangible surface 30 or damage images that are recorded thereon. Light transmissive area 126 can similarly include such a light transmissive material as desired.

In one example, ambient or other light passes through light transmissive area 126 travels to framing matte 120 or onto tangible surface 30. This light is reflectively modulated by images 140, 142 and 144 and/or inter-window areas 136 of framing matte 120 and returns through light transmissive area 126 so that the modulated light is viewable outside of framing system 118. In this regard, light transmissive area 126 can comprise for example, and without limitation an opening between an observer and framing matte 120 and tangible surface 30.

In the embodiment of FIGS. 5A and 5B, internal area 128 is also sized and shaped to hold an optional backing support 129, which can have, for example, mounting structures (not shown) such as hook mountings and the like defined therein. In other embodiments, internal area 128 can optionally be sized to hold a protection layer such as a glass or other transparent or semitransparent sheet (not shown) of conventional design to protect and/or hold framing matte 120 and tangible surface 30.

Figure 6:
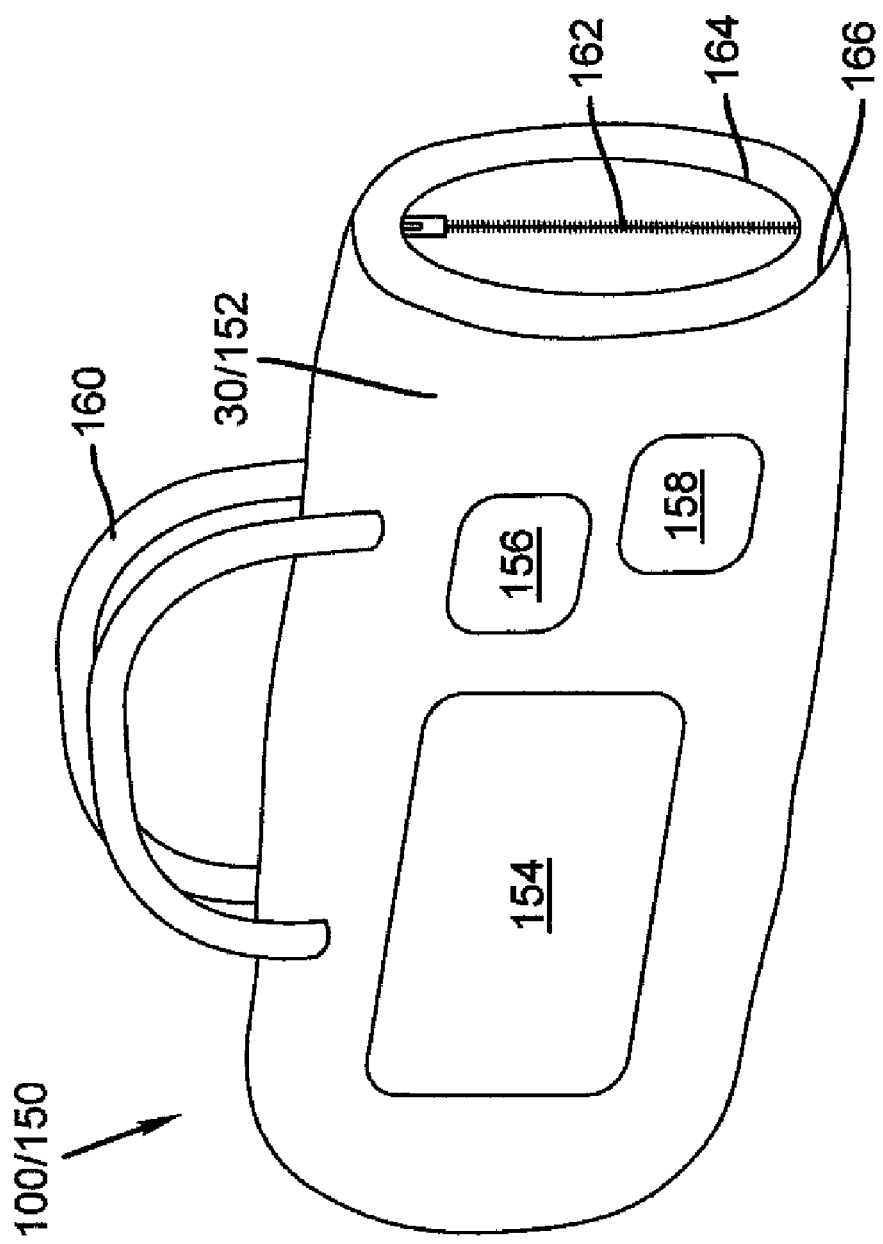
FIG. 6 illustrates another embodiment of an image enhanceable product comprising a tote bag.

FIG. 6 illustrates yet another example of an image enhanceable output product 100 comprising a conventional tote bag 150 having tangible surface 30 in the form of image bearing surface 152 with window areas 154, 156, and 158 in which images can be provided. Here it will be also observed that tote bag 150 has straps 160, pocket area 162 and seams 164 and 166 that are visible image bearing surface 152. As is illustrated in this example, the image enhanceable output product 100 can take any variety of forms.

A printing map is then determined (step 82) that defines a plurality of window areas in which images are to be printed on tangible surface 30. Each window is defined at least by a window shape, optionally, an available image resolution, and location information defining a location of the image window relative to tangible surface 30.

The window shape can be defined using any known logical system for defining shapes. For example and without limitation, the window shapes can be defined by reference to well known geometric constructs, mathematical algorithms or in any other form or manner of defining a shape known in the art of image processing, geometry, computer science or other relevant arts.

The optional available image resolution for a particular window characterizes or identifies the extent to which image picture elements can be recorded within the window shape by output system 28. Typically, this available image resolution will be determined based upon a size and shape of a window and the density of picture elements that output system 28 can record on tangible surface 30.

The location information defines, in some manner, a location or position on tangible surface 30 in which the window shapes are to be defined. The location information can be located in any known fashion. For example, and without limitation, the location information can define a location of the window shape relative to the tangible surface based upon predetermined characteristics of the tangible surface 30, such as perforations, edge locations or margins of the tangible surface 30, or it can define the location of the window shape based upon markers, watermarks, printed text, printed images, seam locations, fabric patterns or other visible features on tangible surface 30. In other non-limiting examples, the location information can define a location for the a window based upon the location of other surfaces that are joined to tangible surface 30 such as for example, and without limitation, straps 160.

In certain embodiments, the printing map can be determined at least in part by obtaining an image enhanceable product identification and determining the printing map by using the product identification to obtain a stored printing map or to obtain previously stored information that can be used to create a printing map, including, but not limited to, pre-stored image shape information, image location information, pattern information and/or algorithms that can be used to determine such information. For example, most consumer goods are associated with identification such as bar codes, watermarks, text, codes and/or radio frequency identifiers that uniquely identify the good being sold. Where system 20 is used in conjunction with products that are associated with such product identification, a user input system 26 or sensor 38 can include an appropriate reader of conventional design to read the identification. Alternatively, a user can enter an identification into user input 26 manually.

Figure 7:
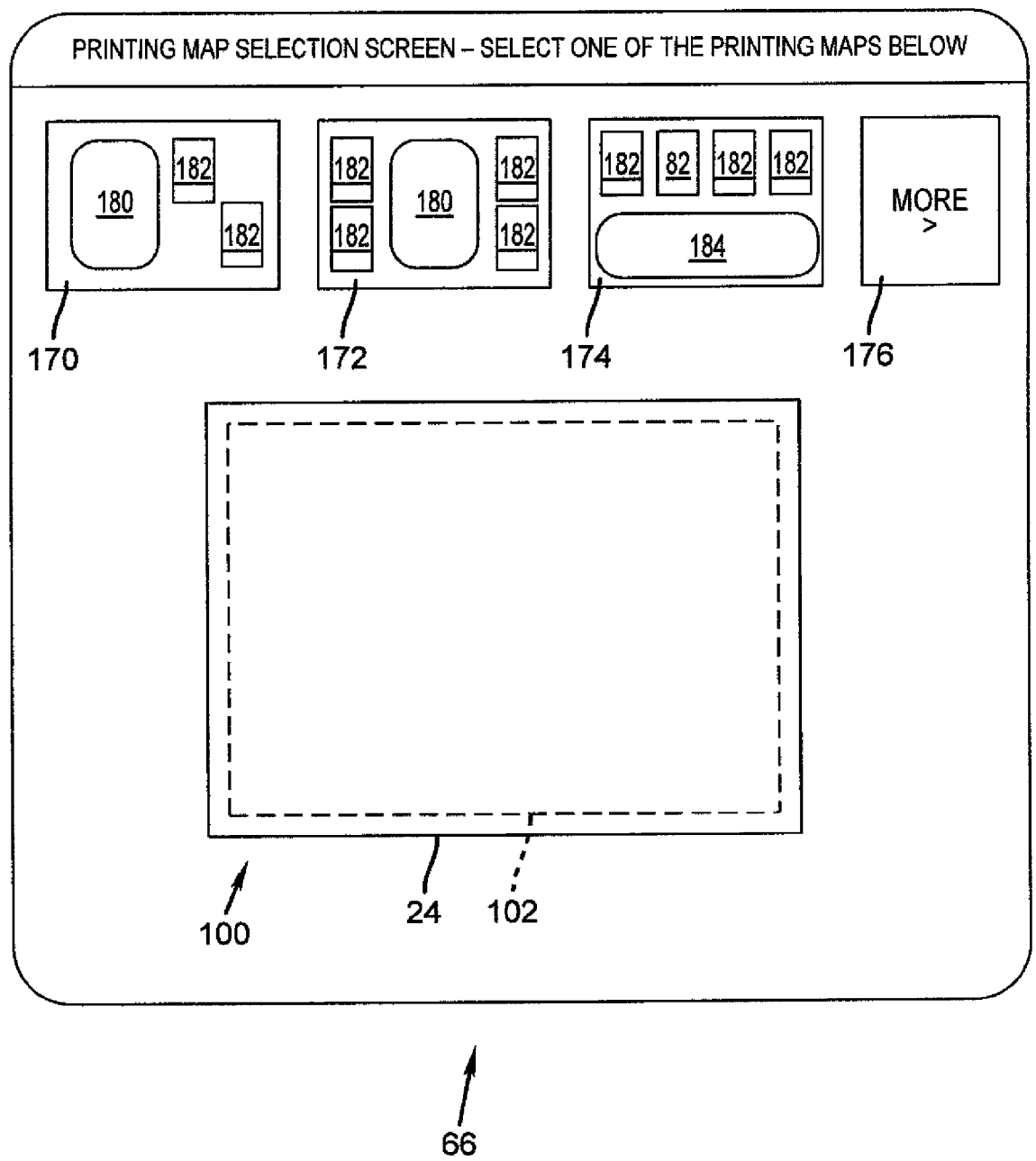
FIGS. 7 and 8 show images of a user interface presentation that allows a user to select a printing map for use with an image enhanced item.

In other embodiments, system 20 can have a user input system 26 or sensors 38 that incorporate an image input source such as a scanner or image capture device of conventional design that can be arranged to capture an image of image enhanced product 100 including tangible surface 30 or a framing or matting system 110 into which tangible surface 30 is to be placed. This image can be examined to determine a product identification for the image enhanced product 100 that can then be used as noted above to identify the image enhanced product. Alternatively, system 20 can execute algorithms to identify portions of tangible surface 30 that are available window areas on tangible surface 30. This analysis can be done automatically based upon rules for identifying image bearing areas of the article. For example, areas of continuous background color in the captured image can be identified as one or more potential window areas and used to form one or more printing maps. Similarly, areas of continuous areas on tangible surface 30 can be identified as window areas and used to form a printing map. Any known algorithm that is suitable for identifying printable areas on a tangible surface 30 can be used for the purpose of generating a printing map.

Where more than one printing map is available, system 20 can request that a user make an input using user input system 26 to select from among the plurality of available printing maps. In one embodiment, illustrated in FIG. 7, system 20 shows a screen shot on local display 66 of a user a plurality of available printing maps 170, 172 and 174, that can be used to print on tangible surface 30 as well as the option 176 to seek additional printing map options. In the illustrated embodiment, printing map one 170 includes one large vertically oriented image 180 and two small images 182, while printing map two 172 includes one large vertically oriented image 180 and four small images 182 and printing map three 174 incorporates four small images 182 and one landscape or wide aspect ratio image 184. A user who is not satisfied with the selection of options can make a more options selection using, for example, button 176 which can obtain additional printing maps from those that may be associated with the image enhanced item. Where more than three printing maps are available, the additional options button 176 can be omitted from presentation by system 20.

Figure 8:
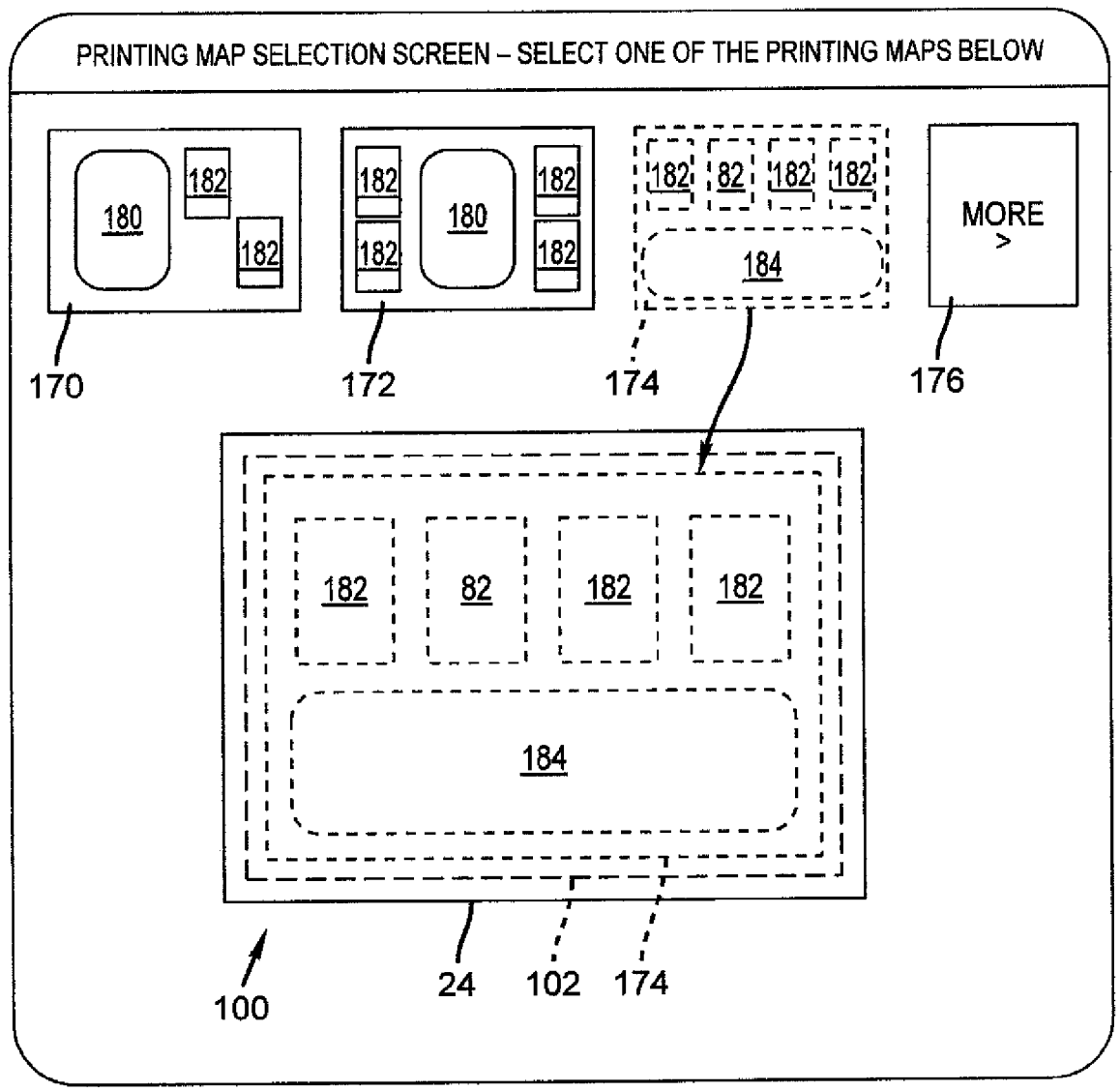

As is illustrated in FIG. 8, a user 72 can then use user input 26 to drag and/or drop a selected template on to a drawing, map, picture or other representation 188 of tangible surface 30 or take such other user input actions as are necessary to indicate that user 72 wished to select one of the templates. In the example shown, the user has selected template 174 and has used a drag and drop technique to indicate that this template is to be generally center mounted with in a representation of the sheet type image enhanceable product 100 of FIG. 4.

At least one visual impact characteristic for the image enhanced output products then determined based upon the appearance of image enhanceable item 100 and the printing map (step 84). Generally speaking, the visual impact characteristic for image enhanceable item 100 will be defined based upon an overall combination of visual features of the image enhanceable item 100 that can be observed by a viewer who is positioned to view at least one of the windows identified by the printing map.

Figure 9:
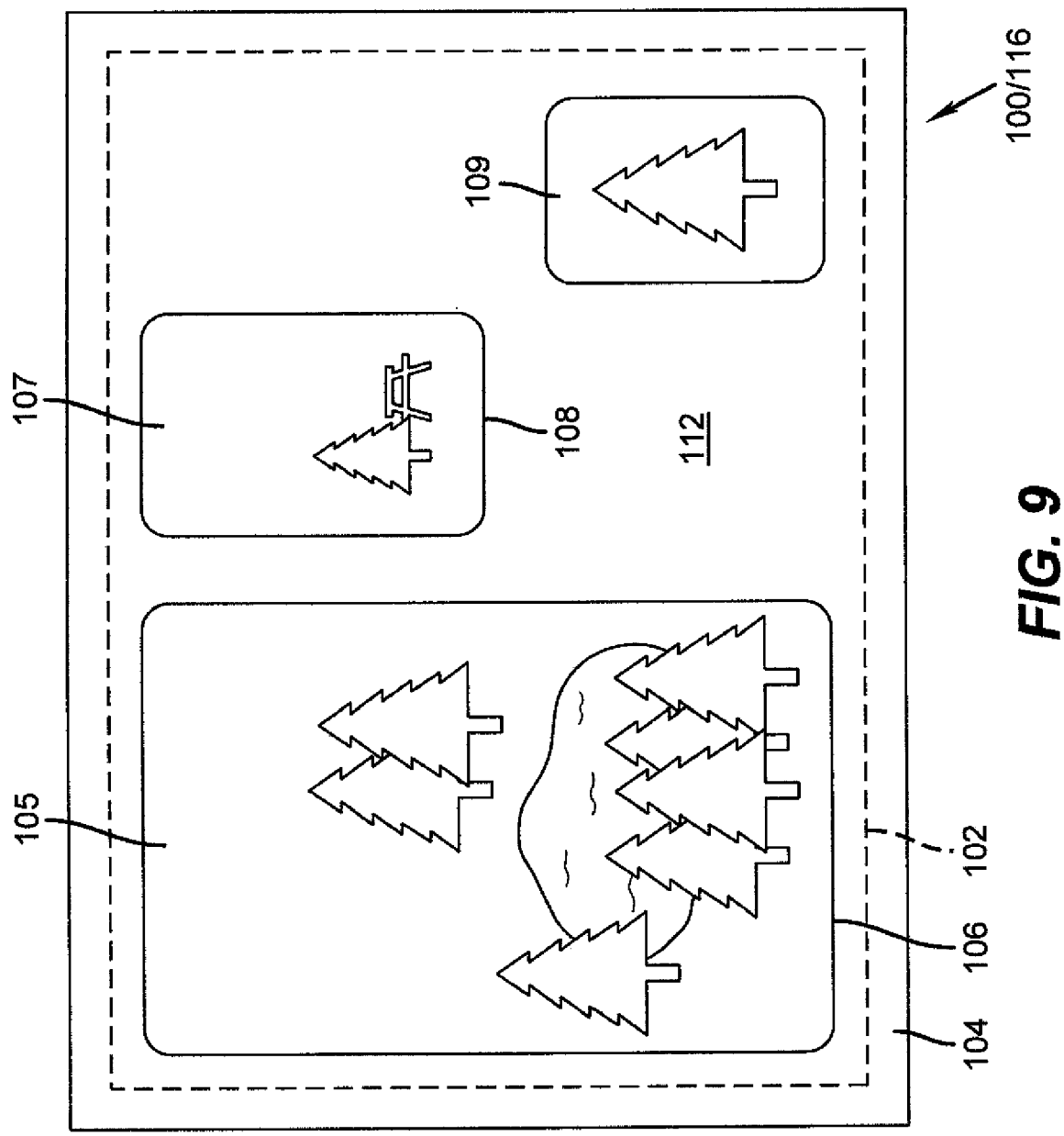
FIG. 9 shows one example of an image enhanced output product.

It will be appreciated that an observer of a finished image enhanced product will observe a product that has a number of visual components. These visual components can include but are not limited to tangible surface 30, framing matte 120 and the overall appearance of any other structures of image enhanceable item 100 that will be visible when images are provided therewith in accordance with the printing map. FIG. 9 illustrates one example of an image enhanced output product 116 that is formed based upon the image enhanceable product 100 that is illustrated in the embodiment of FIG. 4. As is shown in FIG. 9, the overall appearance is dictated by the appearance of the inter-window area 112 as well as images that are recorded in window areas 106, 108 and 110.

Figure 10:
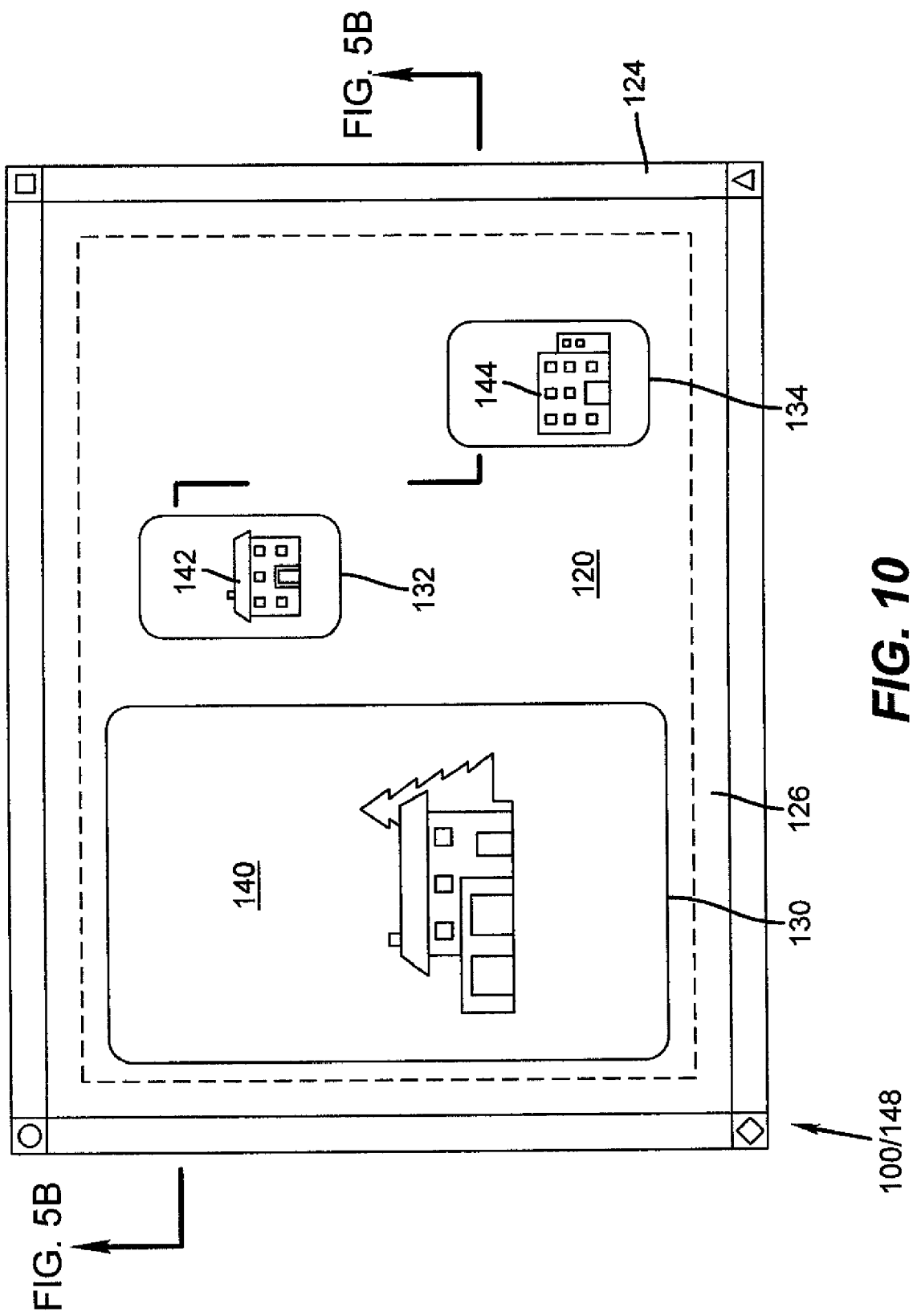
FIG. 10 shows another example of an image enhanced output product.

Similarly, FIG. 10 illustrates one example of an image enhanced output product 148 that is formed based upon the frame and matting combination 118 that is illustrated in the embodiment of FIGS. 5A and 5B. As is shown in FIG. 10 the visual impact of the image enhanced object includes the appearance of images 140, 142 and 144, the appearance of framing matte 120 and the appearance of structural frame 124. Further, the visual components of the embodiment of FIGS. 5A and 5B can include the visual appearance of any material in light transmissive area 126 or in windows 130, 132, or 134.

Figure 11:
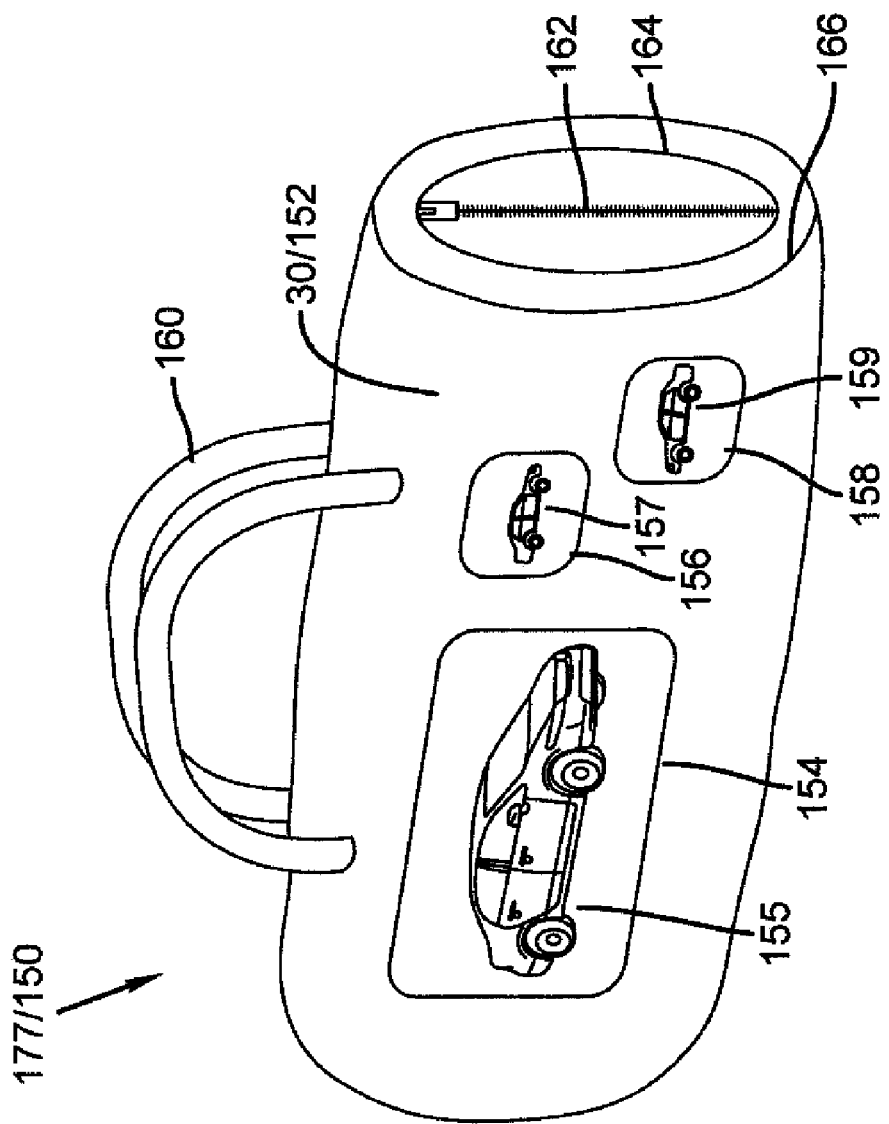
FIG. 11 shows another example of an image enhanced output product.

It will also be appreciated that visual impact of an image enhanceable item 100 will similarly be influenced by any feature of an image enhanceable item 100 that is inherently visible when the images to be printed are visible. For example, FIG. 11 illustrates an example of an image enhanced output product 177 formed comprising a conventional tote bag 150 having tangible surface 30 in the form of image bearing surface 152 with window areas 154, 156, and 158 in which images 155, 157 and 159 have been provided. Here it will be also observed that tote bag 150 has straps 160, pocket area 162 and seams 164 and 166 that are visible image bearing surface 152, the appearance of which should be considered when determining the visual impact of an image enhanced output product that will be formed therefrom.

In sum, the examples of FIGS. 9, 10 and 111 make it clear that the visual impact of an image enhanced output product will be influenced at least by the appearance of tangible surface 30 as well as any other portions of image enhanceable item 100 that are visible when viewed from a perspective that also allows a viewer to observe images that are recorded in the pattern of windows called for by the printing map. All of these factors deserve consideration in determining how to process images for use on the image enhanced item.

Figure 12:
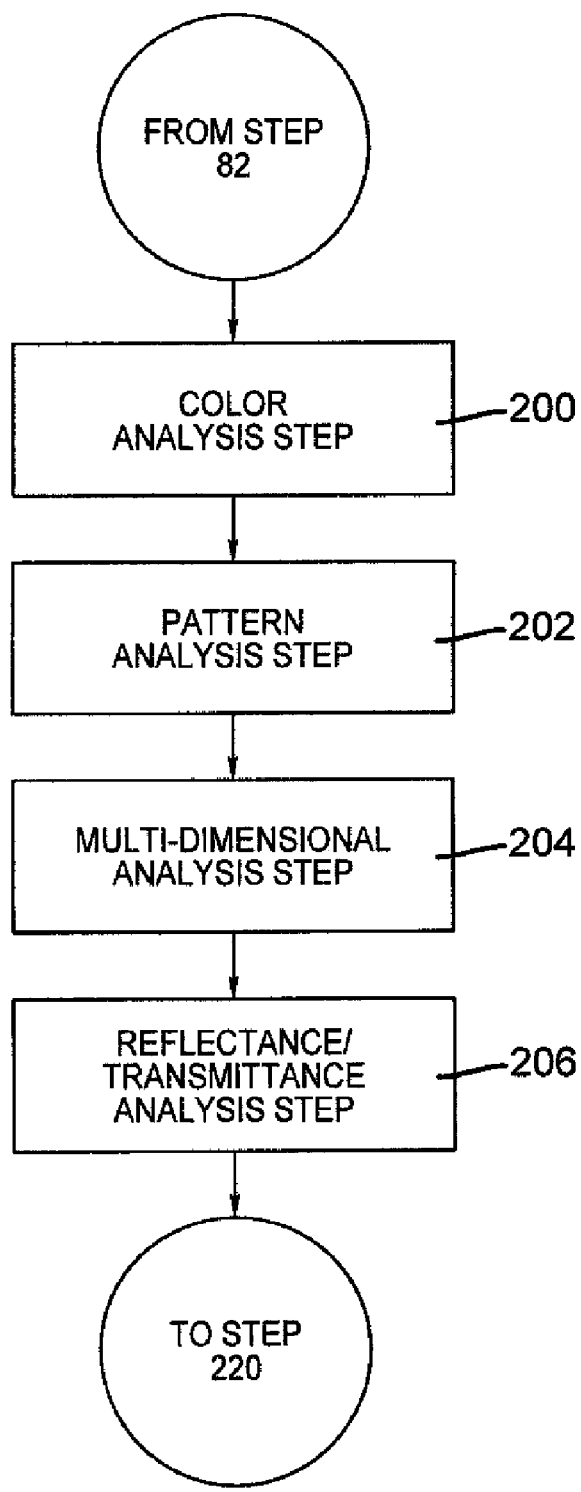
FIG. 12 shows one example embodiment of a flow chart that can be used to analyze an image enhanceable item to determine information from which a visual impact characteristic can be determined.

FIG. 12 shows one embodiment of a method for analyzing the image enhanceable product 100 to determine information that can be used during the process of determining the visual impact characteristic. As is shown in FIG. 9, in a first step of this method a color analysis is performed on the image enhanceable product. This color analysis (step 200) identifies one or more dominant colors that are present at least in the portions of image enhanceable item 100 that will be visible when images are recorded on the image enhanceable item 100 in accordance with the printing map. The color analysis step can also identify gamma and chrominance and other color characteristics of the image enhanceable item 100. The color analysis step can be used to provide color statistics, color histograms and other information relative to the color of the image enhanceable object or other forms of color information that can be used to determine a visual impact characteristic.

A pattern analysis (step 202) is then performed. The pattern analysis evaluates shapes, patterns and forms on at least those portions of the image enhanceable item 100 that will be visible when images are recorded on the image enhanceable item 100 in accordance with the selected printing map. Pattern information can then be provided that characterizes the nature of the pattern, the frequency of the patterns, the shapes, sizes and locations of existing patterns on the image enhanceable product. In one embodiment, the step of performing pattern analysis comprises executing an automated pattern classification algorithm.

Optionally, the pattern analysis step 202 can be performed before the step of color analysis so that the color analysis is performed according to the patterns so that for example, the colors of particularly important patterns and shapes are tracked with precision and so that color analysis can be made in a more accurate fashion by allowing color analysis to be organized in accordance with the tracked patterns so as to prevent misinterpretation of color data. For example, where straps 160 on tote bag 150 are detected using a pattern detection scheme, color analysis of straps 160 can be performed separately from color analysis of tangible surface 30. This can result in better color analysis of both portions of the tote bag 150.

A multi-dimensional analysis (step 204) can also be performed that looks for variations in depth on at least those portions of the image enhanceable product 100 that will be visible when images are recorded on the image enhanceable product 100 in accordance with the printing map. It will be appreciated that such contours can also exert a significant influence on the overall appearance of the image enhanceable product. In one embodiment, such multi-dimensional analysis considers the extent to which contours influence the apparent colors and/or distribution of images that will be provided according to the printing map.

A transmissivity/reflectance analysis (step 208) can also be performed that indicates the refection and transmission characteristics of image enhanceable item 100 so the reflectivity or transmissivity of a protective layer or matte system or a framing system can be characterized automatically to identify whether an image enhanceable item 100 is adapted to present images in a form that will be modified, or that will have certain characteristics such as diffused imagery, or highly transmissive or reflective imagery. For example, it will be appreciated a particular framing system such as the framing system 118 of FIGS. 5A and 5B, has a plurality of components such as structural frame 124, light transmissive area 126 or other regions that can vary in reflectance and/or in light diffusion characteristics. A light reflectance analysis can determine different information when these components are defined in a manner that softens the light or conversely when such components are defined in a manner that provides for high transmission or reflectance. This provides information can be used in determining the visual impact characteristic for the image enhanceable item.

The visual impact characteristic is further defined by the selected printing map. In particular, it will be recalled that the printing map defines window shapes, image resolutions, and locations that will be used in printing images on tangible surface 30. It will also be appreciated that factors such as image size, image shape, image resolution and image arrangement can also influence the desired visual impact of an image enhanced product by defining an overall arrangement of patterns of windows which can create any number of different effects. Specifically, it will be appreciated that the arrangement of window areas defined by the printing map can exert a wide range of influences on the overall appearance of the image enhanced output product 100. For example, differences in the size of the windows, the shape of the windows, the relative geometric arrangement of the windows and the arrangement of the windows relative to other visual features of the image enhanced product 100 can cause the same image enhanceable product 100 to have a vastly different appearance when printed with an orderly arrangement of uniformly shaped windows as compared to the appearance of the same image enhanceable product when printed with a disorderly arrangement of differently shaped windows.

Figure 13:
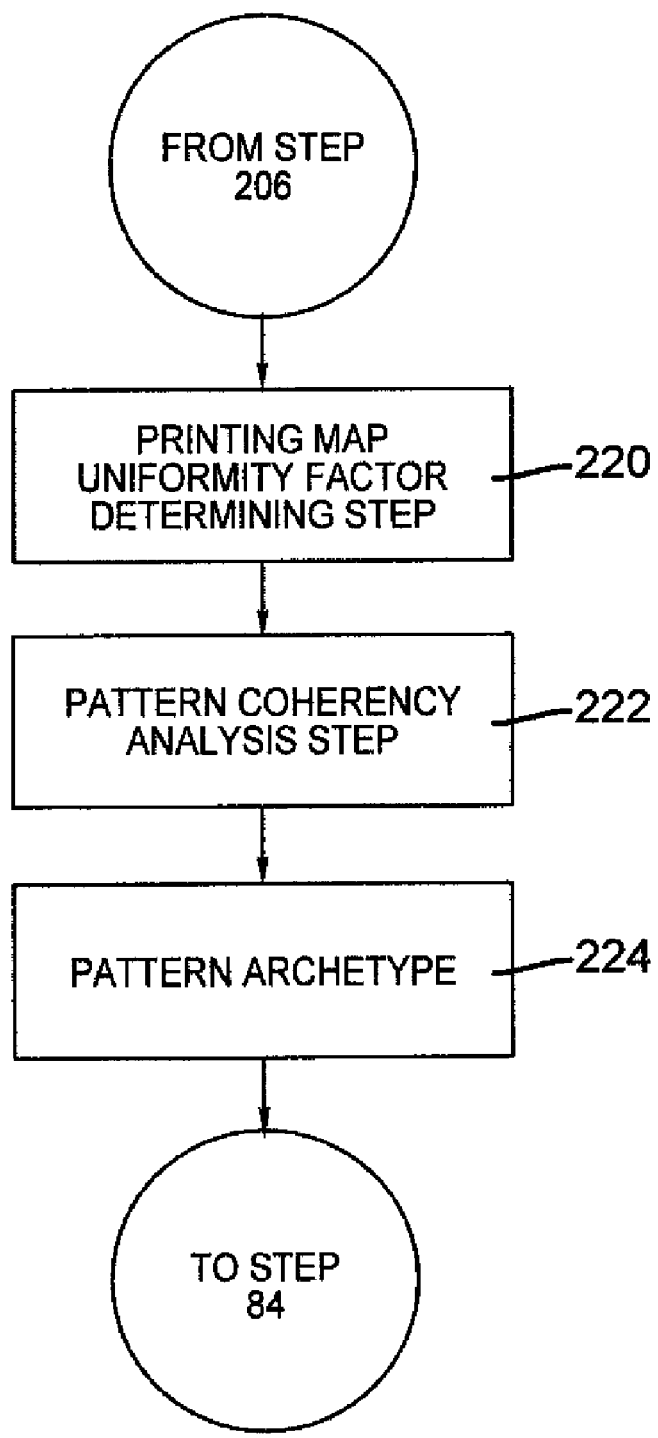
FIG. 13 shows an example embodiment of a flow chart of method steps that can be used to analyze a printing map to determine information from which a visual impact characteristic can be determined; and, FIG. 14 illustrates one example of a truth table that can be used for determining an image processing step based upon a determined visual impact characteristic.

Accordingly, a printing map analysis step or steps can be executed to identify information that can be used in determining the visual impact characteristic. FIG. 13 provides a non-limiting example of some of these steps.

As illustrated in FIG. 13, in one embodiment, the printing map is analyzed to determine a uniformity factor (step 220). The uniformity factor examines the extent to which window shapes and optionally sizes defined by the printing map are consistent across the printing map. This analysis can for example, yield a uniformity score, histogram or other form of output.

A pattern coherency analysis can also be performed on the printing map to determine the extent to which window shapes are arranged in an orderly fashion in the selected printing map (step 222). This analysis can for example, yield a coherency score, shape identification, or other known information that characterizes the arrangement of the pattern of window shapes.

A pattern interpretation analysis can further be performed, which analyzes the arrangement of windows to identify the extent to which archetypal patterns that may be present in the selected printing map (step 224). In this step, the arrangement of windows provided in the printing map is compared to a plurality of archetypal patterns. A pattern interpretation analysis category is then identified that identifies whether the overall distribution of window areas is suggestive of a particular visual archetype such as a regular geometric configuration such as a square, circular, oval or the like, a complex geometric configuration such as a combination of basic geometric configurations or complex configurations such as a Swiss or Maltese cross, a basic educational configuration such as the shape of readily recognizable object such as a car, boat, animal or the like, an advanced or abstract pattern that is merely suggestive of a recognizable pattern, or that is suggestive of abstract concepts such as motion, rest, peace, and the like.

The visual impact characteristic is then determined as a function of the analysis of the visual characteristics of the image enhanceable item 100 and the selected printing map.

FIG. 14 illustrates one example of a truth table that can be used for such a purpose. As is illustrated in FIG. 14, the various characteristics detected during the analysis of the image enhanced product (steps 200, 202, 204 and 206) and the analysis of the printing map (steps 220, 222 and 224) can be integrated to identify a visual impact characteristic. It will be appreciated that this example is non-limiting and that this or any other combination of factors that can be used to determine a visual impact characteristic can be used and integrated in a wide variety of logical forms known to those of skill in the art. This can include the use of programming algorithms, fuzzy logic, or any form of set theory or statistical or probabilistic analysis. In particular, it will be understood that unless otherwise specified, the claims, herein, are not limited in relation to specific technologies. For example, pattern classification and other forms of analysis of the image enhanceable item and/or the printing can be provided by any of the following, individually or in comparison: rule based systems, semantic knowledge network approaches, frame-based knowledge systems, neural networks, fuzzy-logic based systems, genetic algorithm mechanisms, and heuristics-based systems.

Once determined, the visual impact characteristic can be stored in the form of digital data as desired visual impact information in system 20, and can be expressed in any of a variety of forms. The exact form is not critical.

System 20 then receives a selection of a plurality of digital images that are available for use in converting the image enhanceable item 100 into the image enhanced output product 108 (Step 86). This can occur in any number of conventional fashions. For example and without limitation, where a user of system 20 has digital images that are stored in a memory that is integral to system 20 or that can be connected to system 20 such as a memory card, user 72 can use user input system 26 to identify which of the digital images are to be used in the system. Alternatively, user input system 26 can direct system 20 to externally stored data bases of images for use in making the image enhanced product 100.

In one embodiment, the steps of receiving images and determining a printing map can be combined. In one non-limiting example of this type, a user can be provided with a template, drawing or other visual representation of a selected image enhanceable item 100 onto which the user can drag and drop or otherwise place and size selected images in order to prove a uniquely defined arrangement of images relative to the image enhanceable item 100.

At least one image processing method is automatically selected for processing at least one of the plurality of digital images for inclusion in the image enhanced product based upon the determined visual impact characteristic for the image enhanceable product 100 and the determined printing map. (Step 88) In one embodiment, this can be done by logically associating each possible visual impact characteristic with a set of at least one image processing method. For example, the visual impact characteristics of Table I can be logically associated with particular sets of visual impact characteristics as follows:

TABLE I

Non-Limiting Example of Desired Visual Impact Information

| Options | Image Processing |
|---|---|
| Rustic | Sepia or Black & White Processing |
| Contemporary | High Gamma, |
| Urban | Heavy Contrast Black & White, Image Sharpening |
| Warm | Image Softening, De-emphasize lowlights, yellow |
| Baby | Image Softening, Skin Tone Processing |
| Family | Skin Tone Processing, image cropping to faces |
| Backlit | High Gamma Processing, record on transparency |
| Flip Images | Process multiple images for use in single window to so that different images are viewable through a lens system. Used where printing map provides a single window but user places multiple images in the window. |
| Three Dimensional | Process multiple images for use in single window to so a scene image is viewable through a lens system having apparent stereoscopic effects. Used where printing map provides a window that a user intentionally associates a plurality of images |

At least one of the digital images is then processed in accordance with the automatically selected image processing method to form an automatically processed image for recording in one of the windows of the image enhanced product (step 90) and at least some of the digital images including the automatically processed image are provided on the tangible surface according to the printing map in a form that can be used to create the image enhanced output product (step 92). In certain embodiments, this can involve recording the images directly onto a tangible surface that is integral to the output product, however, in other cases such as the where tangible surface 30 is separable from image enhanceable output product, the image enhanceable output product can be printed on a tangible medium 30 in a manner that allows tangible surface to be assembled into or otherwise physically associated with image enhanceable item 100.

Such subsequent assembly steps can involve simply recording the images on a an optional step of forming an image enhanced output product can be performed to provide an optional step of assembly tangible surface 30 to image enhanceable item 100. Any other operations that are necessary to enable completion of an image enhanced output product are reflected in the optional step of forming an image enabled output product shown in FIG. 3 (step 94).

It will be appreciated that, in other embodiments, additional factors can be considered in determining the visual impact characteristic (step 86), in determining an image processing method based upon the visual impact characteristic (step 88) or performing the determining image processing (step 90). For example, a single image enhanceable item 100 is potentially capable of being associated with more than one type of visual impact characteristic, as for example, a tote bag 150 of FIG. 6, can have one type of visual impact characteristic for athletic use as opposed to academic use. In another example, an individual visual impact characteristic can be associated with any of a number of image processing steps, and the additional factors can be used to select between individual ones of the image processing steps, to determine an emphasis between individual image processing steps and to help to selectively omit particular image processing steps or to add additional image processing steps. Alternatively, such additional factors can be used to influence the way in which image processing steps that have been selected based upon the visual impact, characteristics are executed, such as by adjusting the intensity of other characteristics of such changes.

In one embodiment, system 20 is adapted to allow user 72 to make a manual entry of a preference that will impact the selection of the visual impact characteristic In another embodiment, an emotional context can also be manually entered by a user 72 that can be used in forming the image enhanced output product 108. Table II provides a non-limiting example of emotional context information that can be supplied by a user 72.

TABLE II

Non Limiting Examples of Emotional Context
Emotional Context

HAPPY
SERIOUS
PROFESSIONAL
FUN
ACTIVE
RESTIVE

Such emotional context information can be associated with particular image processing steps that can supplement, supplant or modify image processing steps that are identified based upon the visual impact characteristic in step 86. Table III shows some examples of this.

TABLE III

Non Limiting Examples of Emotional Context & Image Processing

| Emotional Context | Image Processing |
|---|---|
| HAPPY | Emphasis on Faces, image highlights. |
| SERIOUS | Darkening, emphasis on low light |
| PROFESSIONAL | Image Sharpening |
| FUN | Emphasis on oversized images and unusual window shapes, unnatural image modifications (i.e. coloring book, fisheye) |
| ACTIVE | Emphasize or create motion blur, crop to active poses. |
| RESTIVE | Emphasize neutral tones, mid-range, reduce gamma. |

In still another example of the use of additional information, the step of automatically selecting at least one image processing method for processing at least one of the plurality of digital images for inclusion in the image enhanced product (step 88) can further include the steps of extracting portions of an image that depict a subject of the image, wherein said subject is identified based upon the identification of an event. The event identification can be manual, with a user of system 20 using user input system 26 to select an event from a menu of events provided by system 20. Each event is associated with rules for identifying subject areas that are depicted in the selected set of images.

This can be done, for example, by identifying a particular graphical aspects of particular subjects that may appear in a set of images that depict an event. For example, a wedding typically has a well recognized set of characters that can be easily identified by their manner of dress and positioning as the subject of an image. Similarly, images of other well defined events such as athletic events, performances, graduations and the like are all typically associated with particular images or image components that can be used to help to automatically identify the subject of particular scenes. Similar analyses and processing can be performed based upon an identified subject, or based upon a common object in the images. There are a wide variety of known algorithms that can be used for this purpose.

Such determinations can be used to inform a step of automatically selecting at least one image processing method for processing at least one of the plurality of digital images for inclusion in the image enhanced output product can be performed such that images are automatically incorporated or cropped based upon such determinations.

Similarly, the step of automatically selecting at least one image processing method for processing at least one of the plurality of digital images for inclusion in the image enhanced output product can be performed by determining a context for the selected images and modifying images or information in the processed image(s) based upon the determined context. Similarly, the step of automatically selecting at least one image processing method for processing at least one of the plurality of digital images for inclusion in the image enhanced product (step 88) can comprise identifying additional content to be incorporated with the digital image. Such context can be determined automatically or manually.

It will be appreciated that many of the possible image enhanceable items have a plurality of tangible surfaces with more than one tangible surface having a visual appearance area having a plurality of locations in which images can be provided. In such situations an overall appearance of the image enhanceable item can be determined and a map of potential areas that can support printing maps can be created from which an overall visual impact characteristic can be determined. Where this is done, said step of determining a visual impact characteristic can be repeated for each tangible surface and the determination of a visual impact characteristic for each tangible surface can further be determined at least in part based upon the overall visual impact characteristic.

The invention has been described in detail with particular reference to certain preferred embodiments thereof, but it will be understood that variations and modifications can be effected within the spirit and scope of the invention.

PARTS LIST

| | |
|---|---|
| 20 | system |
| 22 | housing |
| 24 | source of content data files |
| 26 | user input system |
| 28 | output system |
| 29 | printer |
| 30 | tangible surface |
| 34 | processor |
| 38 | sensors |
| 39 | video sensors |
| 40 | memory |
| 42 | hard drive |
| 44 | disk drive |
| 46 | memory card slot |
| 48 | removable memory |
| 50 | memory interface |
| 52 | remote memory system |
| 54 | communication system |
| 56 | remote display |
| 58 | remote input |
| 58a | remote keyboard |
| 58b | remote mouse |
| 58c | remote control |
| 66 | local display |
| 68 | local input |
| 68a | local keyboard |
| 68b | local mouse |
| 70 | editing studio or kiosk |
| 72 | user |
| 74 | audio sensors |
| 80 | identify image enhanceable product step |
| 82 | determine printing map step |
| 84 | determine visual impact characteristic |

-continued

PARTS LIST

| | |
|---|---|
| 86 | receive images step |
| 88 | automatically determine image processing step |
| 90 | perform determined image processing step |
| 92 | record processed images and other images according to printing map |
| 94 | form image enhanced output product |
| 100 | image enhanceable item |
| 102 | image receiving area |
| 104 | first side of image receiving area |
| 106 | window area |
| 108 | window area |
| 110 | window area |
| 112 | inter-window area |
| 116 | image enhanced output product |
| 118 | matte and frame system |
| 120 | framing matte |
| 124 | structural frame |
| 126 | light transmissive area |
| 128 | internal area |
| 129 | backing area |
| 130 | window |
| 132 | window |
| 134 | window |
| 140 | images |
| 142 | images |
| 144 | images |
| 148 | image enhanced output product |
| 150 | tote bag |
| 152 | image bearing surface |
| 154 | window areas |
| 155 | images |
| 156 | window areas |
| 157 | images |
| 159 | images |
| 160 | straps |
| 162 | pocket area |
| 164 | seams |
| 166 | seams |
| 170 | printing map |
| 172 | printing map |
| 174 | printing map |
| 176 | button |
| 177 | image enhanced output product |
| 180 | vertically oriented image |
| 182 | small images |
| 184 | wide aspect ratio image |
| 188 | other representation |
| 200 | step |
| 202 | pattern analysis step |
| 204 | multi-dimensional analysis step |
| 206 | step |
| 208 | transmissivity/reflectance analysis step |
| 220 | uniformity factor of printing map determining step |
| 222 | pattern coherency of printing map determining step |
| 224 | archetypical pattern detecting step |

The invention claimed is:

1. A method for operating a computer and a printer for generating a tangible surface with a digitally processed image for attaching to an image enhanced output product, the method comprising the steps of:
identifying an image enhanceable product having a tangible surface on which a plurality of images can be provided;
in a computer memory, storing a plurality of digital images, storing a plurality of images corresponding to a tangible surface of an image enhanced output product for receiving printed images, and storing a plurality of printing maps, said printing maps defining a plurality of window areas in which images are to be printed on an image receiving medium with each window being defined at least by a window shape, and location information defining a location of the window area relative to the tangible surface;
from the computer memory, retrieving an image of a tangible surface and a printing map;
displaying the retrieved image of the tangible surface on the computer display;
determining a printing map that defines a plurality of window areas in which images are to be printed on an image receiving medium with each window being defined at least by a window shape, and location information defining a location of the window area relative to the tangible surface;
on the display, overlaying the printing map on the image of the tangible surface;
automatically determining at least one selected visual impact characteristic including one or more of the group consisting of colors, including gamma, chrominance, patterns, including intensity, frequency and regularity, contours, including soft and hard, transmissivity, reflectance, including matte, glossy and semi-glossy of the image to be applied to the product, cropping, and positioning for the image enhanced product based upon the appearance of the image enhanceable product and the printing map;
from the computer memory, retrieving a selection of a plurality of digital images that are available for use in the image product;
automatically selecting at least one image processing method for processing at least one of the plurality of digital images for inclusion in the image enhanced product based upon the determined visual impact characteristic for the image enhanced product;
automatically processing at least one of the digital images in accordance with the automatically selected image processing method; and
providing at least some of the digital images, including the automatically processed image, on the tangible surface according to the printing map in a form that can be used to create the image enhanced output product.

2. The method of claim 1, further comprising the step of identifying image content from the plurality of images for printing in particular ones of the plurality of windows based upon the determined selected visual impact characteristic and wherein the step of automatically processing at least one of the digital images uses the identified image content to perform said automatic processing.

3. The method of claim 1, wherein the step of determining a printing map that defines a plurality of window areas in which images are to be printed on the tangible surface with each window being defined at least by a window shape, an available image resolution, and location information defining a location of the image window relative to the tangible surface comprises obtaining an image enhanced product identification and determining the printing map based upon the image enhanced product identification.

4. The method of claim 1, wherein the step of determining a printing map that defines a plurality of window areas in which images are to be printed on the tangible surface with each window being defined at least by a window shape, and location information defining a location of the image window relative to the tangible surface comprises capturing an image of the tangible surface or a framing or matting system into which a tangible surface is to be placed and identifying window areas on the tangible surface based upon analysis of the captured image.

5. The method of claim 1, wherein said step of automatically selecting at least one image processing method for processing at least one of the plurality of digital images for inclusion in the image enhanced product is further based, in part, upon analyzing the plurality of images to identify a contextual relationship between the subject matter depicted in the plurality of images.

6. The method of claim 1, wherein said step of automatically selecting at least one image processing method for processing at least one of the plurality of digital images for inclusion in the image enhanced product is based upon a user selection of at least one of a preferred visual impact, a selected emotional context, or a preferred visual impact reference.

7. The method of claim 1, wherein said step of automatically selecting at least one image processing method for processing at least one of the plurality of digital images for inclusion in the image enhanced product is based upon an identification of an event, an identification of a subject or based upon the a common subject or object in the images.

8. The method of claim 7, wherein the step of automatically selecting at least one image processing method for processing at least one of the plurality of digital images for inclusion in the image enhanced product comprises extracting portions of an image that depict the identified subject, event or object.

9. The method of claim 1, further comprising the step of automatically identifying a subject or object that is common to the plurality of the images wherein the step of automatically selecting at least one image processing method for processing at least one of the plurality of digital images for inclusion in the image enhanced product is based upon the common subject.

10. The method of claim 1, wherein the step of automatically selecting at least one image processing method for processing at least one of the plurality of digital images for inclusion in the image enhanced product comprises identifying additional content to be incorporated with the digital image.

11. The method of claim 1, wherein the image enhanceable item has more than one tangible surface upon which images can be recorded and wherein an overall appearance of the image enhanceable item determined and a map of potential areas that can support printing maps is created from which an overall visual impact characteristic can be determined, and wherein said step of determining a visual impact characteristic for each tangible surface is further determined at least in part based upon the overall visual impact characteristic.

12. A method for operating a computer coupled to printer in an image processing system to generate an image for use in an image enhanced output product, the method comprising the steps of:
in a computer memory, storing a plurality of digital images, a plurality of image corresponding to a tangible surface for receiving printed images, and a plurality of printing maps, said printing maps defining a plurality of window areas in which images are to be printed on an image receiving medium with each window being defined at least by a window shape, and location information defining a location of the window area relative to the tangible surface;
identifying an image enhanceable product is identified having a tangible surface associated therewith;
retrieving from memory a printing map that defines a plurality of window areas in which images are to be printed on the tangible surface;
automatically determining a selected visual impact characteristic selected from the group consisting of colors, including gamma, chrominance, patterns, including intensity, frequency and regularity, contours, including soft and hard, transmissivity, reflectance, including matte, glossy and semi-glossy of the image to be applied to the product, cropping, and positioning based upon the appearance of the image enhanceable product and the printing map;
from the computer memory, selecting one or more digital images and inserting the retrieved digital images into the window areas defined by the printing map for use in forming the image enhanceable output product;
selecting an image processing method based upon the determined visual impact characteristic automatically processing at least one of the digital images is in accordance with the selected image processing method; and
providing at least some of the digital images, including the automatically processed image, are provided on the tangible surface according to the printing map.

13. A system for generating an image enhanced output product comprising:
a computer including a processor, a memory, a user input system, and a display output;
a printer coupled to the computer and operable to print a plurality of images on an image receiving medium of a tangible surface of an image enhanced output product;
the computer memory for storing a plurality of digital images, storing a plurality of images corresponding to tangible surfaces for receiving printed images, and storing a plurality of printing maps, said printing maps defining a plurality of window areas in which images are to be printed on an image receiving medium with each window being defined at least by a window shape, and location information defining a location of the window area relative to the tangible surface;
the user input system adapted to sense a user input action identifying an image enhanceable product having a tangible surface on which a plurality of images can be provided and for receiving a selection of a plurality of digital images that are available for use in the image enhanceable output product;
a processor adapted to:
determine a printing map in the computer memory that defines a plurality of window areas in which images are to be printed on an image receiving medium with each window being defined at least by a window shape, and location information defining a location of the window area relative to the tangible surface;
automatically determine at least one selected visual impact characteristic selected from the group consisting of colors, including gamma, chrominance, patterns, including intensity, frequency and regularity, contours, including soft and hard, transmissivity, reflectance, including matte, glossy and semi-glossy of the image to be applied to the product, cropping, and positioning for the image enhanced product based upon the appearance of the image enhanceable product and the printing map, and
select at least one image processing method for processing at least one of the plurality of digital images for inclusion in the image enhanced product based upon the determined visual impact characteristic for the image enhanced product;
automatically process at least one of the digital images in accordance with the automatically selected image processing method; and
cause an output system to provide at least some of the digital images, including the automatically processed image, on the tangible surface according to the printing map in a form that can be used to create the image enhanced output product.

14. A method for operating a computer and a printer to print a plurality of images on an image receiving medium of a tangible surface of an image enhanced output product, the method comprising the steps of:
- in a computer memory, storing a plurality of digital images, storing a plurality of images corresponding to a tangible surface for receiving printed images, and storing a plurality of printing maps, said printing maps defining a plurality of window areas in which images are to be printed on an image receiving medium with each window being defined at least by a window shape, and location information defining a location of the window area relative to the tangible surface;
- from the computer memory, retrieving an image of a tangible surface and a printing map;
- from the computer memory, retrieving one or more digital images and inserting the retrieved digital images into the window areas defined by the printing map;
- automatically analyzing the images for one or more characteristics of the image to be applied to the product, said characteristics selected from the group consisting of colors, including gamma, chrominance, patterns, including intensity, frequency and regularity, contours, including soft and hard, transmissivity, reflectance, including matte, glossy and semi-glossy, facial features, environmental features, and scene content;
- associating two or more of the characteristics together to define a plurality of visual impact characteristics;
- providing a set of digital image processes each of which alters one or more of the individual characteristic of the image to provide the associated visual impact characteristic;
- associating each altered digital image with a digital process to achieve the visual impact characteristic;
- applying a printing map to an image of tangible surface of a product; and
- processing each digital image in accordance with the associate digital image processes; and
- printing at least some of the digital images on the tangible surface according to the printing map in a form that can be used to create the image enhanced output product.

15. The method of claim 14, further comprising the step of identifying image content from the retrieved digital images and processing at least one of the retrieved digital images to achieve the one or more selected visual impact characteristics.

16. The method of claim 14, comprising the further step of associating one or more printing maps with different image enhanced products, selecting one of the image enhanced products and retrieving an associated a printing map that defines a plurality of window areas in which images are to be printed on the tangible surface with each window being defined at least by a window shape, an available image resolution, and location information defining a location of the image window relative to the tangible surface.

17. The method of claim 14, comprising the further step of generating one or more printing maps by capturing an image of the tangible surface or a framing or matting system into which a tangible surface is to be placed and identifying window areas on the tangible surface based upon analysis of the captured image.

18. The method of claim 14, wherein said step of selecting at least one image processing method for processing at least one of the plurality of digital images for inclusion in the image enhanced product is selected in accordance with a contextual relationship between the subject matter depicted in the plurality of images.

19. The method of claim 14, wherein said step of selecting at least one image processing method for processing at least one of the plurality of digital images for inclusion in the image enhanced product is selected in accordance with least one of a preferred visual impact, a selected emotional context, or a preferred visual impact reference.

20. The method of claim 14, wherein said step of selecting at least one image processing method for processing at least one of the plurality of digital images for inclusion in the image enhanced product is selected in accordance with an identification of an event, an identification of a subject or based upon a common subject or object in the images.

21. The method of claim 20, wherein the step of selecting at least one image processing method for processing at least one of the plurality of digital images for inclusion in the image enhanced product comprises extracting portions of an image that depict the identified subject, event or object.

22. The method of claim 14, wherein the step of selecting at least one image processing method for processing at least one of the plurality of digital images for inclusion in the image enhanced product comprises identifying additional content to be incorporated with the digital image.

23. The method of claim 14, wherein the image enhanceable item has more than one tangible surface upon which images can be recorded and wherein an overall appearance of the image enhanceable item is determined and a map of potential areas that can support printing maps is created from which an overall visual impact characteristic can be determined, and wherein said step of determining a visual impact characteristic for each tangible surface is further determined at least in part based upon the overall visual impact characteristic.

24. A system for generating an image enhanced output product comprising:
- a computer including a processor, a memory, a user input system, and a display output,
- a printer coupled to the computer and operable to print a plurality of images on an image receiving medium of a tangible surface of an image enhanced output product;
- the computer memory for storing a plurality of digital images, storing a plurality of images corresponding to tangible surfaces for receiving printed images, and storing a plurality of printing maps, said printing maps defining a plurality of window areas in which images are to be printed on an image receiving medium with each window being defined at least by a window shape, and location information defining a location of the window area relative to the tangible surface;
- one or more programs stored in memory;
- the user input system adapted to sense a user input action identifying an image enhanceable product having a tangible surface on which a plurality of images can be provided and for receiving a selection of a plurality of digital images that are available for use in the image enhanceable output product;
- a processor running the one or more programs for:
    - analyzing the images for one or more individual characteristics, said individual characteristics selected from the group consisting of colors, including gamma, chrominance, patterns, including intensity, frequency and regularity, contours, including soft and hard, transmissivity, reflectance, including matte, glossy and semi-glossy, facial features, environmental features, and scene content;
    - associating one or more of the characteristics together to define a plurality of visual impact characteristics;

providing a set of digital image processes each of which alters one or more of the individual characteristic of the image to provide the associated visual impact characteristic;

associating each altered digital image with a digital process to achieve the visual impact characteristic;

applying a printing map to an image of tangible surface of a product;

processing each digital image in accordance with the associate digital image processes; and printing at least some of the digital images on the tangible surface according to the printing map in a form that can be used to create the image enhanced output product.

* * * * *